(12) United States Patent
Song et al.

(10) Patent No.: US 8,906,510 B2
(45) Date of Patent: Dec. 9, 2014

(54) FILM COMPOSITION AND METHOD OF MAKING THE SAME

(75) Inventors: Kwangjin Song, Pittsford, NY (US); Pang-Chia Lu, Pittsford, NY (US); Etienne R. H. Lernoux, Grez-Doiceau (BE); George F. Cretekos, Farmington, NY (US)

(73) Assignee: Jindal Films Americas LLC, Macedon, NY (US)

( * ) Notice: Subject to any disclaimer, the term of this patent is extended or adjusted under 35 U.S.C. 154(b) by 108 days.

(21) Appl. No.: 13/203,894

(22) PCT Filed: Apr. 15, 2009

(86) PCT No.: PCT/US2009/040678
§ 371 (c)(1),
(2), (4) Date: Dec. 14, 2011

(87) PCT Pub. No.: WO2010/120295
PCT Pub. Date: Oct. 21, 2010

(65) Prior Publication Data
US 2012/0263960 A1  Oct. 18, 2012

(51) Int. Cl.
| | | |
|---|---|---|
| *B32B 15/08* | (2006.01) | |
| *B32B 27/32* | (2006.01) | |
| *C08J 5/18* | (2006.01) | |
| *C08L 23/16* | (2006.01) | |
| *C08L 23/10* | (2006.01) | |
| *C08L 23/12* | (2006.01) | |
| *C08L 23/14* | (2006.01) | |

(52) U.S. Cl.
CPC .. *C08L 23/12* (2013.01); *C08J 5/18* (2013.01); *C08L 2314/06* (2013.01); *C08L 23/16* (2013.01); *C08L 23/142* (2013.01); *C08L 23/10* (2013.01); *C08J 2323/10* (2013.01); *B32B 27/32* (2013.01); *C08L 2314/02* (2013.01)
USPC .......................................... 428/461; 428/523

(58) Field of Classification Search
None
See application file for complete search history.

(56) References Cited

U.S. PATENT DOCUMENTS

| | | | |
|---|---|---|---|
| 4,767,675 A | * | 8/1988 | Cyr et al. ...................... 428/515 |
| 5,693,317 A | | 12/1997 | Reich et al. |
| 6,773,818 B2 | | 8/2004 | Cretekos et al. |
| 2004/0072004 A1 | | 4/2004 | Migliorini et al. |
| 2007/0287007 A1 | | 12/2007 | Williams et al. |
| 2007/0292682 A1 | | 12/2007 | Lee et al. |
| 2007/0298233 A1 | | 12/2007 | Dharmarajan et al. |
| 2008/0070047 A1 | | 3/2008 | Rehkugler et al. |
| 2008/0220226 A1 | | 9/2008 | Koehn et al. |
| 2009/0087648 A1 | | 4/2009 | Lee |

FOREIGN PATENT DOCUMENTS

| | | | |
|---|---|---|---|
| EP | 1 864 793 | * | 12/2007 |
| WO | WO 2007/142720 | | 12/2007 |
| WO | WO 2008/033622 | | 3/2008 |

OTHER PUBLICATIONS

Glenn Williams et al. "Films from Vistamaxx™ Specialty Elastomers", Dec. 16, 2006, FlexPack Conference 2006, Paper and Presentation, Orlando.
Srivatsan Srinivas et al. "VISTAMAXX Specialty Elastomers, Novel Polyolefin Polymers from ExxonMobil Chemical", Paper and Presentation, Flexcon Conference, Sep. 2003, Chicago.

* cited by examiner

*Primary Examiner* — Sheeba Ahmed

(57) ABSTRACT

This disclosure relates to a film comprising a metal receiving layer, the first layer comprising a blend of a first polymer and 5-25 wt. % of a second polymer, the second polymer is a metallocene-catalyzed elastomeric ethylene-propylene copolymer having an ethylene content of less than or equal to 10 wt. %, the first polymer is different from the second polymer.

21 Claims, No Drawings

FILM COMPOSITION AND METHOD OF MAKING THE SAME

CROSS-REFERENCE TO RELATED APPLICATIONS

This application is a National Stage Application of International Application No. PCT/US2009/040678, filed Apr. 15, 2009, the disclosure of which is incorporated by reference in its entirety.

FIELD OF THE INVENTION

This invention relates generally to a film composition and the method of making the same. More particularly this invention relates to a film composition comprising a blend of a polyolefin and a metallocene catalyzed polyolefin copolymer, which has high metal adhesion.

BACKGROUND OF THE INVENTION

Metallized films may be used as a barrier web to provide product protection in flexible packages. For example, a sealable high barrier film may be used in the inside of a chip bag, which requires very low moisture and oxygen transmission rates. Very low transmission rates would be defined as oxygen transmission rate (OTR) less than about 20, preferably less than about 15 $cc/m^2/day/atm$ and water vapor transmission rate (WVTR) less than about 0.5, preferably less than about 0.2 $g/m^2/day$. To consistently achieve very low OTR and WVTR, transmission rates, high metal adhesion is required.

It is desirable for a metallized film to have adequate adhesion between the vapor-deposited metal layer and the film's metal receiving layer. Often, the higher the bond strength between the metal receiving layer of a film and the metal layer, the better. Higher metal adhesion can result in a more robust film in terms of barrier properties, lamination bond strengths and improvement on metal pick-off and loss during the packaging process when the film is dragged over the forming collar on VFFS machines. More specifically, by improving the metal adhesion, barrier properties are improved by minimizing the amount of metal pick-off and loss during the vacuum metallizing process and rewinding process. Package lamination bond strengths are improved when a metallized film with high metal adhesion is used in a multi-layer lamination. In thick multi-layer bags with many gussets and folds in the sealed areas (e.g. stand-up pouches), the metal layer often delaminates from the metal receiving layer. This can cause package failure or result in a "bag within a bag" phenomenon. Accordingly, films having high metal adhesion properties are highly desirable.

Aesthetic appearance is also important. It is desired that the metal surface of a metallized film has a bright, shiny, reflective appearance. Such a shiny metal appearance is especially desirable when the package includes bright, reflective metal in the finished graphics.

Another aspect of metallized polymer film is to ensure that the metal layer does not "craze" during extrusion lamination processes. Due to the high heat load from the molten polymer, the metal receiving layer may melt or deform and can fracture and crack. This will degrade gas and moisture vapor barrier properties of a film.

Preparation and metallization of a polymeric metal receiving layer, such as a metal receiving layer comprising Zeigler-Natta catalyzed polypropylene homopolymer (z-nPP), is a difficult process. Surface treatment, while is required to get low transmission rates and high metal adhesion to the surface of the metal receiving layer, breaks down the surface's polymer chains to produce low molecular weight oligomeric materials (LMWOM) on the surface. After metallization, low molecular weight oligomeric materials may break away from the surface causing the metal adhesion to be poor.

In addition, for polypropylene (PP) and other high melting point polymeric materials (about 155 to 168° C.), scratches generated in the machine direction orientation (MDO) can be a persistent problem. Frequent cleaning of the MDO rolls may be required to maintain good appearance. High percentage of scratches is observed for a blend of z-nPP and propylene-butene (PB) copolymers that melt above ~148° C.

US Patent Application No. 2007/0292682 describes laminate films including a polyolefin base layer, and a metal receiving layer including a blend of propylene homopolymer or mini-random propylene-ethylene copolymer, and an amorphous poly-alpha-olefin or ethylene-propylene elastomer. The metal receiving layer may also include an ethylene-propylene copolymer. The laminate film may also include additional layers such as an additional polyolefin resin-containing layer, a metal layer, or combinations thereof.

Low melting point polymeric materials (about 120 to 150° C.) have better traction property during the MDO process. Defects formed in the MDO process tend to melt and smooth over in the oven of the transverse direction orientation (TDO) process. However, using a propylene-based material with a melting point lower than ~148° C. makes the surface much more susceptible to crazing during extrusion lamination.

Adding ethylene-propylene (EP) copolymer, low molecular weight waxes or hydrocarbon resins to polypropylene resin improves metal adhesion but increases crazing tendency and barrier degradation under strain. Also, adding too much Zeigler-Natta catalyzed ethylene-polypropylene (z-nEP) copolymer increases transmission rates.

Therefore, there is a need to develop a film having very low transmission rates, high metal adhesion and low craze in extrusion lamination process.

SUMMARY OF THE INVENTION

In some embodiments of this disclosure, there is provided a film comprising a first layer, the first layer comprising a blend of a first polymer and 5-25 wt. % of a second polymer, the second polymer is a metallocene-catalyzed ethylene-propylene elastomer having an ethylene content of less than or equal to 11 wt. %, the first polymer is different from the second polymer.

The film of this disclosure has an oxygen transmission rate (OTR) of less than or equal to 20 $cc/m^2/24$ hr, as determined in accordance with ASTM D 3985 at 73° F. (23° C.) and 0% relative humidity (RH), and a water vapor transmission rate (WVTR) of less than or equal to 0.50 $g/m^2/24$ hr, as determined in accordance with ASTM F 1249 at 100° F. (37.8° C.) and 90% RH.

The film of this disclosure further comprises a metal layer, the metal layer is manufactured by vacuum deposition of at least one of aluminum, silver, copper, gold, silicon, germanium, iron, and nickel.

In other embodiments, this disclosure relates to a method of making film of this disclosure, the method comprises:

a. extruding a blend of a first polymer and 5-25 wt. % of a second polymer, the second polymer is a metallocene-catalyzed ethylene-propylene copolymer having an ethylene content of less than or equal to 10 wt. % to form the first layer, optionally co-extruding the blend with at least one polymeric material to form a multilayer film; optionally b. orienting the film in at least one of MD, TD, or both; and/or c. metallizing the first layer.

In yet other embodiments, this disclosure relates to a film comprising a metal receiving layer which comprises a blend of a polyolefin homopolymer, such as, a Zeigler-Natta catalyzed polypropylene and 5-25 wt. % of a metallocene-catalyzed ethylene-propylene copolymer. The polyolefin homopolymer has a molecular weight distribution (MWD) measured by ASTM method D5296-05. The blend is selected such that the blend has bi-modal molecular weight distribution characteristics and a molecular weight distribution at least 10% broader than the MWD of the polyolefin homopolymer.

In a preferred embodiment, this disclosure relates to a film having a metal receiving layer which comprises a blend of a Zeigler-Natta catalyzed polypropylene and 5-25 wt. % of a metallocene-catalyzed ethylene-propylene copolymer having ethylene content of less than 11 wt. %.

A film having the metal receiving layer of this disclosure possesses unexpectedly low oxygen transmission rates (OTR) and low water vapor transmission rates (WVTR), good metal adhesion and low crazy property.

DETAILED DESCRIPTION OF THE PREFERRED EMBODIMENTS

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

As used herein, "polymer" may be used to refer to homopolymers, copolymers, interpolymers, terpolymers, etc.

As used herein, unless specified otherwise, the term "copolymer(s)" refers to polymers formed by the polymerization of at least two different monomers. For example, the term "copolymer" includes the copolymerization reaction product of ethylene and an alpha-olefin (α-olefin), such as 1-hexene. However, the term "copolymer" is also inclusive of, for example, the copolymerization of a mixture of ethylene, propylene, 1-hexene, and 1-octene.

As used herein, unless specified otherwise, the term "terpolymer(s)" refers to polymers formed by the polymerization of at least three distinct monomers.

As used herein, unless specified otherwise, the term "elastomer" refers to a polymer with the property of elasticity.

As used herein, the term "crazing" refers to spider web shaped micro-cracks across the surface when viewed closely from certain angle, which has been described in EP-1864793A1, WO-2008/033622A2, and WO-2004/033195A1 and the entirety of which are incorporated by reference. In particular, the metal crazing used in this disclosure refers to a behavior of the metal layer to form fine cracks stacked along the transverse direction (TD) under external heat and/or stress conditions.

As used herein, weight percent ("wt. %"), unless noted otherwise, means a percent by weight of a particular component based on the total weight of the mixture containing the component. For example, if a mixture or blend contains three grams of compound A and one gram of compound B, then the compound A comprises 75 wt. % of the mixture and the compound B comprises 25 wt. %.

The first polymer of metal receiving layer may be a polymer of an olefin monomer having 2 to 10 carbons. Examples of first polymer include polyethylene, polypropylene, and isotactic propylene homopolymer. Suitable isotactic propylene homopolymers for the first polymer include ExxonMobil PP 4712, TOTAL EOD02-19 or TOTAL 3576X.

In certain embodiments, the second polymer of the metal receiving layer is a propylene-α-olefin copolymer, preferably an propylene-α-olefin copolymer, such as, metallocene-catalyzed elastomeric ethylene-propylene copolymer, having a melting temperature ($T_m$) in the range of 60° C. to about 150° C., preferably in the range of about 80° C. to about 150° C., or in the range of about 60 to 140° C., more preferably in the range of about 80° C. to about 120° C., and most preferably in the range of about 85° C. to about 110° C.

In certain embodiments, the propylene-α-olefin copolymers have a single peak melting transition as determined by DSC; in certain embodiments the propylene-α-olefin copolymer has a primary peak melting transition from less than 90° C., with a broad end-of-melt transition from greater than about 110° C. The peak "melting point" ($T_m$) is defined as the temperature of the greatest heat absorption within the range of melting of the sample. However, the propylene-α-olefin copolymer may show secondary melting peaks adjacent to the principal peak, and/or the end-of-melt transition, but for purposes herein, such secondary melting peaks are considered together as a single melting point, with the highest of these peaks being considered the $T_m$ of the propylene-α-olefin copolymer. The propylene-α-olefin copolymers have a peak melting temperature ($T_m$) from about 60 or 70 or 80 or 90 or 100 or 105° C. to less than about 100 or 110 or 120 or 130 or 135 or 136 or 138 or 139 or 140 or 145 or 150 or 155 or 160° C. in some embodiments.

The procedure for DSC determinations is as follows. About 0.5 grams of polymer was weighed out and pressed to a thickness of about 15-20 mils (about 381-508 microns) at about 140° C.-150° C., using a "DSC mold" and Mylar™ as a backing sheet. The pressed pad was allowed to cool to ambient temperature by hanging in air (the Mylar was not removed). The pressed pad was annealed at room temperature (about 23-25° C.) for about 8 days. At the end of this period, an about 15-20 mg disc was removed from the pressed pad using a punch die and was placed in a 10 microliter aluminum sample pan. The sample was placed in a differential scanning calorimeter (Perkin Elmer Pyris 1 Thermal Analysis System) and was cooled to about −100° C. The sample was heated at about 10° C./min to attain a final temperature of about 165° C. The thermal output, recorded as the area under the melting peak of the sample, is a measure of the heat of fusion and can be expressed in Joules per gram (J/g) of polymer and was automatically calculated by the Perkin Elmer System. Under these conditions, the melting profile shows two (2) maxima, the maxima at the highest temperature was taken as the melting point within the range of melting of the sample relative to a baseline measurement for the increasing heat capacity of the polymer as a function of temperature.

In certain embodiments, the propylene-α-olefin copolymer comprises ethylene or $C_4$-$C_{10}$ α-olefin-derived units (or "comonomer-derived units") within the range from 5 or 7 or 8 or 10 to 11 wt % by weight of the copolymer. The propylene-α-olefin copolymer may also comprise two different comonomer-derived units. Also, these copolymers and terpolymers may comprise diene-derived units as described below. In a particular embodiment, the propylene-α-olefin copolymer comprises propylene-derived units and comonomer units selected from ethylene, 1-hexene and 1-octene. And in a more particular embodiment, the comonomer is ethylene, and thus the propylene-α-olefin copolymer is an elastomeric propylene-ethylene copolymer.

In one embodiment, the propylene-α-olefin copolymer comprises from less than 10 or 8 or 5 or 3 wt %, by weight of the copolymer or terpolymer, of diene derived units (or "diene"), and within the range from 0.1 or 0.5 or 1 to 5 or 8 or 10 wt % in yet another embodiment. Suitable dienes include for example: 1,4-hexadiene, 1,6-octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof. The diene, if present, is most preferably ENB.

In certain embodiments, the propylene-α-olefin copolymers have a triad tacticity of three propylene units, as measured by $^{13}$C NMR, from greater than 75% or 80% or 82% or 85% or 90%. In one embodiment, the triad tacticity is within the range from 50 to 99%, and from 60 to 99% in another embodiment, and from 75 to 99% in yet another embodiment, and from 80 to 99% in yet another embodiment; and from 60 to 97% in yet another embodiment. Triad tacticity is determined as follows: The tacticity index, expressed herein as "m/r", is determined by $^{13}$C nuclear magnetic resonance (NMR). The tacticity index m/r is calculated as defined by H. N. Cheng in 17 MACROMOLECULES 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios from greater than 50. Embodiments of the propylene-α-olefin copolymer have a tacticity index m/r within the range from 4 or 6 to 8 or 10 or 12.

In certain embodiments, the propylene-α-olefin copolymers have a heat of fusion ($H_f$), determined according to the Differential Scanning calorimetry (DSC) procedure described herein, within the range from 0.5 or 1 or 5 J/g, to 35 or 40 or 50 or 65 or 75 J/g. In certain embodiments, the $H_f$ value is from less than 75 or 65 or 55 J/g.

In certain embodiments, the propylene-α-olefin copolymers have a percent crystallinity within the range from 0.5 to 40%, and from 1 to 30% in another embodiment, and from 5 to 25% in yet another embodiment, wherein "percent crystallinity" is determined according to the DSC procedure described herein. (The thermal energy for the highest order of polypropylene is estimated at 189 J/g (i.e., 100% crystallinity is equal to 189 J/g)). In another embodiment, the propylene-α-olefin copolymer has a percent crystallinity from less than 40% or 25% or 22% or 20%.

In certain embodiments, the propylene-α-olefin copolymers have a density within the range from 0.840 to 0.920 g/cm$^3$, and from 0.845 to 0.900 g/cm$^3$ in another embodiment, and from 0.850 to 0.890 g/cm$^3$ in yet another embodiment, the values measured at room temperature per the ASTM D-1505 test method.

In certain embodiments, the propylene-α-olefin copolymers have a Shore A hardness (ASTM D2240) within the range from 10 or 20 to 80 or 90 Shore A. In yet another embodiment, the propylene-α-olefin copolymers possess an Ultimate Elongation from greater than 500% or 1000% or 2000%; and within the range from 300 or 400 or 500% to 800 or 1200 or 1800 or 2000 or 3000% in other embodiments.

In certain embodiments, the propylene-α-olefin copolymers have a weight average molecular weight (Mw) value within the range from 20,000 to 5,000,000 g/mole, and from 50,000 to 1,000,000 g/mole in another embodiment, and from 70,000 to 400,000 g/mole in yet another embodiment. In another embodiment, the propylene-α-olefin copolymers have a number average molecular weight (Mn) value within the range from 4,500 to 2,500,000 g/mole, and from 20,000 to 250,000 g/mole in yet another embodiment, and from 50,000 to 200,000 g/mole in yet another embodiment. In yet another embodiment, the propylene-α-olefin copolymers have a z-average molecular weight (Mz) value within the range from 20,000 to 7,000,000 g/mole, and from 100,000 to 700,000 g/mole in another embodiment, and from 140,000 to 500,000 g/mole in yet another embodiment.

In certain embodiments, the propylene-α-olefin copolymers have a melt flow rate ("MFR," ASTM D1238, 2.16 kg, 230° C.), from less than 90 or 70 or 50 or 40 or 30 or 20 or 10 dg/min, and within the range from 0.1 or 0.5 or 1 or 5 or 10 to 20 or 30 or 40 or 50 or 70 or 90 dg/min in other embodiments.

In certain embodiments, a desirable molecular weight (and hence, a desirable MFR) is achieved by visbreaking the propylene-α-olefin copolymers. The "visbroken propylene-α-olefin copolymers" (also known in the art as "controlled rheology" or "CR") is a copolymer that has been treated with a visbreaking agent such that the agent breaks apart the polymer chains. Non-limiting examples of visbreaking agents include peroxides, hydroxylamine esters, and other oxidizing and free-radical generating agents. Stated another way, the visbroken copolymer may be the reaction product of a visbreaking agent and the copolymer. In particular, a visbroken propylene-α-olefin copolymer is one that has been treated with a visbreaking agent such that its MFR is increased, in one embodiment by at least 10%, and at least 20% in another embodiment relative to the MFR value prior to treatment.

In certain embodiments, the molecular weight distribution (MWD) of the propylene-α-olefin copolymers is within the range from 1.5 or 1.8 or 2.0 to 3.0 or 3.5 or 4.0 or 5.0 or 10.0 in particular embodiments. Techniques for determining the molecular weight (Mn, Mz and Mw) and molecular weight distribution (MWD) are as follows, and as by Verstate et al. in 21 MACROMOLECULES 3360 (1988). Conditions described herein govern over published test conditions. Molecular weight and molecular weight distribution are measured using a Waters 150 gel permeation chromatograph equipped with a Chromatix KMX-6 on-line light scattering photometer. The system was used at 135° C. with 1,2,4-trichlorobenzene as the mobile phase. Showdex™ (Showa-Denko America, Inc.) polystyrene gel columns 802, 803, 804 and 805 are used. This technique is discussed in LIQUID CHROMATOGRAPHY OF POLYMERS AND RELATED MATERIALS III 207 (J. Cazes ed., Marcel Dekker, 1981). No corrections for column spreading were employed; however, data on generally accepted standards, for example, National Bureau of Standards, Polyethylene (SRM 1484) and anionically produced hydrogenated polyisoprenes (an alternating ethylene-propylene copolymer) demonstrate that such corrections on Mw/Mn or Mz/Mw are less than 0.05 units. Mw/Mn was calculated from an elution time-molecular weight relationship whereas Mz/Mw was evaluated using the light scattering photometer. The numerical analyses can be performed using the commercially available computer software GPC2, MOLWT2 available from LDC/Milton Roy-Riviera Beach, Fla.

The propylene-α-olefin copolymers described herein can be produced using any catalyst and/or process known for producing polypropylenes. In certain embodiments, the propylene-α-olefin copolymers can include copolymers prepared according to the procedures in WO 02/36651, U.S. Pat. No. 6,992,158, and/or WO 00/01745. Preferred methods for producing the propylene-α-olefin copolymers are found in US Patent Application Publication 2004/0236042 and U.S. Pat. No. 6,881,800. Preferred propylene-based polyolefin polymers are available commercially under the trade names Vistamaxx™ (ExxonMobil Chemical Company, Houston, Tex., USA) and Versify™ (The Dow Chemical Company, Midland, Mich., USA), certain grades of Tafiner™ XM or Notio™ (Mitsui Company, Japan) or certain grades of Softell™ (LyondellBasell Polyolefine GmbH, Germany). A commercial example of an ethylene-based polyolefin copolymer is Infuse™ olefin block copolymers (Dow Chemical). In some embodiments, the second polymer of the metal receiving layer is a metallocene-catalyzed ethylene-propylene copolymer having an ethylene content of less than about 11 wt. %, preferably less than about 9 wt. %, and more preferably less than about 8 wt. %. Suitable metallocene-catalyzed ethylene-propylene copolymers include ExxonMobil Chemical's Vistamaxx™ series of elastomers, particularly Vistamaxx™ 3000 having and ethylene content of 11 wt. % and Vistamaxx™ 3980 having and ethylene content of 9 wt. %. Other suitable EP elastomers include DOW CHEMICAL VERSIFY elastomers, particularly grades DP3200.01 having an ethylene content of 9 wt. %, and Mitsui Chemical's Nitio™ series having Tm about 100° C. or greater, such as, PN-2070, PN-3560, PN-0040 and PN-2060.

The blend for the metal receiving layer has about 5-25 wt. %, 10-25 wt. %, 15-25 wt. %, or 16-25 wt. % of a second polymer, preferably from about 10 to 25 wt. %. The remainder of the metal receiving layer blend is preferably an isotactic propylene homopolymer.

In one embodiment, the first polymer is a Zeigler-Natta catalyzed polypropylene. The blend for the metal receiving layer has a bimodal molecular weight distribution has the characteristics of combination of a narrow MWD and broad MWD.

In some embodiments, the film useful for this disclosure may further comprise additional layer(s), such as core layer, skin layer, sealant layer, tie layer, metal deposit layer, and any combination thereof. The film may be oriented uniaxially or biaxially.

In other embodiments, the additional layer(s) of the film may comprise a propylene polymer, ethylene polymer, isotactic polypropylene ("iPP"), high crystallinity polypropylene ("HCPP"), low crystallinity polypropylene, isotactic and syndiotactic polypropylene, ethylene-propylene ("EP") copolymers, and combinations thereof.

The film of this disclosure may be uniaxially or biaxially oriented. Orientation in the direction of extrusion is known as machine direction ("MD") orientation. Orientation perpendicular to the direction of extrusion is known as transverse direction ("TD") orientation. Orientation may be accomplished by stretching or pulling a film first in the MD followed by the TD. Orientation may be sequential or simultaneous, depending upon the desired film features. Preferred orientation ratios are commonly from between about three to about six times the extruded width in the MD and between about four to about ten times the extruded width in the TD.

The metal receiving surface of the film may be surface-treated to increase the surface energy of the film to render the film receptive to metallization, coatings, printing inks, and/or lamination. The surface treatment can be carried out according to one or several of the methods known in the art. Preferred methods include, but are not limited to, corona discharge, flame treatment, plasma treatment, chemical treatment, or treatment by means of a polarized flame.

The surface of the metal receiving layer may be metallized using conventional methods, such as vacuum deposition of at least one metal such as aluminum, silver, copper, gold, silicon, germanium, iron, nickel, chromium, or mixtures thereof.

Additives

One or more layers of the film, such as the metal receiving layer, may further contain one or more additives. Examples of useful additives include, but are not limited to, opacifying agents, pigments, colorants, cavitating agents, slip agents, antioxidants, anti-fog agents, anti-static agents, anti-block agents, moisture barrier additives, gas barrier additives, hydrocarbon resins, hydrocarbon waxes, fillers such as calcium carbonate, diatomaceous earth and carbon black, and combinations thereof. Such additives may be used in effective amounts, which vary depending upon the property required.

Examples of suitable opacifying agents, pigments, or colorants include, but are not limited to, iron oxide, carbon black, aluminum, titanium dioxide, calcium carbonate, poly terephthalate, talc, beta nucleating agents, and combinations thereof.

Cavitating agents or void-initiating particles may be added to one or more layers of the film to create an opaque film. Preferably, the cavitating agents or void-initiating particles are added to the core layer. Generally, the cavitating or void-initiating additive includes any suitable organic or inorganic material that is incompatible with the polymer material(s) contained in the layer(s) to which the cavitating or void-initiating additive is added, at the temperature of biaxial orientation. Examples of suitable void-initiating particles include, but are not limited to, polybutylene teraphthalate ("PBT"), nylon, cyclic-olefin copolymers, solid or hollow pre-formed glass spheres, metal beads or spheres, ceramic spheres, calcium carbonate, talc, chalk, or combinations thereof. The average diameter of the void-initiating particles typically ranges from about 0.1 μm to 10 μm. The particles may be of any desired shape, or preferably they are substantially spherical in shape. Preferably, the cavitating agents or void-initiating particles are present in the layer at less than 30 wt %, or less than 20 wt %, or most preferably in the range of 2 wt % to 10 wt %, based on the total weight of the layer. Alternatively, one or more layers of the film may be cavitated by beta nucleation, which includes creating beta-form crystals of polypropylene and converting at least some of the beta-crystals to alpha-form crystals thus leaving small voids remaining after the conversion.

Slip agents that may be used include, but are not limited to, higher aliphatic acid amides, higher aliphatic acid esters, waxes, silicone oils, and metal soaps. Such slip agents may be used in amounts in the range of 0.1 wt % to 2 wt % based on the total weight of the layer to which it is added. An example of a fatty acid slip additive that may be used is erucamide. In one embodiment, a conventional polydialkylsiloxane, such as silicone oil or silicone gum, additive having a viscosity of 10,000 to 2,000,000 cSt is used.

Non-migratory slip agents may be used in one or more of the outer surface layers of the films. Non-migratory means that these agents do not generally change location throughout the layers of the film in the manner of migratory slip agents. A preferred non-migratory slip agent is polymethyl methacrylate ("PMMA"). The non-migratory slip agent may have a mean particle size in the range of 0.5 μm to 15 μm, or 1 μm to 10 μm, or 1 μm to 5 μm, or 2 μm to 4 μm, depending on the layer's thickness and desired slip properties. Alternatively, the size of the particles in the non-migratory slip agent, such as PMMA, may be greater than 10% of the thickness of the surface layer containing the slip agent, or greater than 20% of the layer's thickness, or greater than 50% of the layer's thickness, or in some embodiments greater than 100% of the layer's thickness. Generally spherical, particulate non-migratory slip agents are contemplated. A commercially available example of a PMMA resins is EPOSTAR™ which is available from Nippon Shokubai Co., Ltd. of Japan.

An example of a suitable antioxidant includes phenolic anti-oxidants, such as IRGANOX® 1010, which is commercially available from Ciba-Geigy Company of Switzerland. Such an antioxidant may be used in an amount ranging from 0.1 wt % to 2 wt %, based on the total weight of the layer to which it is added.

Anti-static agents that may be used include alkali metal sulfonates, polyether-modified polydiorganosiloxanes, polyalkylpheylsiloxanes, tertiary amines, glycerol mono-sterate, blends of glycerol mono-sterate and tertiary amines, and combinations thereof. Such anti-static agents may be used in amounts in the range of about 0.05 wt % to 3 wt %, based on the total weight of the layer to which the anti-static is added. An example of a suitable anti-static agent is ARMOSTAT™ 475, commercially available from Akzo Nobel.

Useful antiblock additives include, but are not limited to, silica-based products such as inorganic particulates such as silicon dioxide, calcium carbonate, magnesium silicate, aluminum silicate, calcium phosphate, and the like. Other useful antiblock additives include polysiloxanes and non-meltable crosslinked silicone resin powder, such as TOSPEARL™, which is commercially available from Toshiba Silicone Co., Ltd. Anti-blocking agents may be effective in amounts up to about 30,000 ppm of the layer to which it is added.

Examples of useful fillers include but are not limited to, finely divided inorganic solid materials such as silica, fumed silica, diatomaceous earth, calcium carbonate, calcium silicate, aluminum silicate, kaolin, talc, bentonite, clay, and pulp.

Suitable moisture and gas barrier additives may include effective amounts of low-molecular weight resins, hydrocarbon resins, particularly petroleum resins, styrene resins, cyclopentadiene resins, and terpene resins. The film may also contain a hydrocarbon wax in one or more layers. The hydrocarbon wax may be either a mineral wax or a synthetic wax. Hydrocarbon waxes may include paraffin waxes and microcrystalline waxes. Typically, paraffin waxes having a broad molecular weight distribution are preferred as they generally provide better barrier properties than paraffin waxes with a narrow molecular weight distribution.

Optionally, one or more of the outer surface layers may be compounded with a wax or coated with a wax-containing coating, for lubricity, in amounts in the range of 2 wt % to 15 wt % based on the total weight of the layer.

Coatings

One or more coatings, such as for barrier, printing, and/or processing, may be applied to one or both of the outer surfaces of the films. Preferably, the coating is not applied to surface of the metal receiving layer prior to the metal deposition. Such coatings may include acrylic polymers, such as ethylene acrylic acid ("EAA"), ethylene methyl acrylate copolymers ("EMA"), polyvinylidene chloride ("PVDC"), poly(vinyl) alcohol ("PVOH"), ethylene(vinyl)alcohol ("EVOH"), and combinations thereof.

EXAMPLES

Various resins used in the examples are listed in Table 1.

TABLE 1

| Resin | Description | Melt flow rate g/ 10 min | Density g/cm$^3$ | $T_m$ °C. | Vicat Softening point °C. |
|---|---|---|---|---|---|
| ExxonMobil PP 4712 | z-n isotactic PP | 2.8 | 0.90 | 160 | N/A |
| ExxonMobil PP 4772 | z-n isotactic PP | 1.6 | 0.9 | 162 | N/A |
| Vistamaxx ™ 3980 | m-EP copolymer (9% ethylene) | 8.0 | 0.87 | 80 | 64 |

TABLE 1-continued

| Resin | Description | Melt flow rate g/ 10 min | Density g/cm$^3$ | $T_m$ °C. | Vicat Softening point °C. |
|---|---|---|---|---|---|
| Vistamaxx ™ 1000 | m-EP copolymer (16% ethylene) | 3.0 | 0.86 | 50 | 45 |
| Vistamaxx ™ 6102 | m-EP copolymer (16% ethylene) | 3.0 | 0.86 | N/A | 59 |
| Mitsui Tafmer ™ XM7070 | m-PB copolymer | 7.0 | N/A | N/A | 67 |
| Total M7672 | m-EP copolymer | 12.0 | 0.90 | 140 | N/A |
| Basell Clyrell RC1601 | z-n PB copolymer | 5.0 | 0.90 | 149 | 140 |
| Borealis Borseal ™ TD908BF | z-n PB copolymer | 6.0 | N/A | 148 | 117 |
| Japan Polypropylene Corporation JPP 7794 | $C_2$-$C_3$-$C_4$ terpolymer | 5.0 | N/A | 122 | N/A |

N/A: Data are not available.

Examples E1-E7 and comparative examples C1-C12 were made with the following film structure:

| Treatment/Metal layer | Various treatment and/or metal |
|---|---|
| Metal receiving layer | Blends as described in Table 2, about 0.5-0.75 μm |
| Core layer | ExxonMobil 4712, about 16-22 μm |
| Sealant layer | JPP 7794 ($C_2$-$C_3$-$C_4$ terpolymer), about 1 μm |

The metal receiving layers of examples 1-7 (E1-E7) and comparative examples 2-12 (C1-C12) were made with blends by pellet-blending resins according to the ratios as listed in the Table 2. The blends were extruded in a single-screw extruder to melt blend the resins together.

TABLE 2

| Example | Metal receiving layer blend |
|---|---|
| E1 | 10 wt. % Vistamaxx ™ 3980 and 90 wt. % ExxonMobil 4712 |
| E2 | 20 wt. % Vistamaxx ™ 3980 and 80 wt. % ExxonMobil 4712 |
| E3 | 15 wt. % Vistamaxx ™ 3980 and 85 wt. % ExxonMobil 4712 |
| E4 | 5 wt. % Vistamaxx ™ 3980 and 95 wt. % ExxonMobil 4712 |
| E5 | 15 wt. % Vistamaxx ™ 3980 and 85 wt. % ExxonMobil 4712 |
| E6 | 25 wt. % Vistamaxx ™ 3980 and 75 wt. % ExxonMobil 4712 |
| C1 | 10 wt. % Vistamaxx ™ 1000 and 90 wt. % ExxonMobil 4712 |
| C2 | 10 wt. % Tafmer XM7070 and 90 wt. % ExxonMobil 4712 |
| C3 | 20 wt. % Tafmer XM7070 and 80 wt. % ExxonMobil 4712 |
| C4 | 30 wt. % Total M7672 and 70 wt. % ExxonMobil 4712 |
| C5 | 30 wt. % Total M7672 and 70 wt. % ExxonMobil 4772 |
| C6 | 50 wt. % Basell Clyrell RC1601 and 50 wt. % ExxonMobil 4712 |
| C7 | 25 wt. % Borealis Borseal ™ TD908BF and 75 wt. % ExxonMobil 4712 |
| C8 | 50 wt. % Vistamaxx ™ 3980 and 50 wt. % ExxonMobil 4712 |
| C9 | 5 wt. % Vistamaxx ™ 6102 and 95 wt. % ExxonMobil 4712 |
| C10 | 15 wt. % Vistamaxx ™ 6102 and 85 wt. % ExxonMobil 4712 |
| C11 | 25 wt. % Vistamaxx ™ 6102 and 75 wt. % ExxonMobil 4712 |
| C12 | 50 wt. % Vistamaxx ™ 6102 and 50 wt. % ExxonMobil 4712 |

Rolls of film for examples E1-E2, E4-E6 and C1-C5 and C8-C12 were prepared with a 1.5 meter wide orientor. The metal receiving layer blends were co-extruded with resins for core layer and sealant layer. The three-layer extruded sheets were quenched on a casting drum at approximately 45° C. The sheets were then reheated to 90-130° C. and stretched 4.8 times in the machine direction of the orienter. Again the sheets were heated to 150-180° C. and stretched 8.0 times in the transverse direction of the orienter. The films were flame-treated after orientation and then being metallized.

Metal adhesion data were measured by adhesive laminating method and/or by EAA method. The metallized films used in the laminating method were plasma treated and metallized in a Galileo metallizer, then, the metallized films were laminated with urethane-based adhesive. The metallized films used in the EAA method were metallized in a laboratory metallizer (Bell-jar) without plasma-treatment, then, the metallized films were laminated with ethylene acrylic acid (EAA) and heat-sealed to the metal surface using a Lako SL-10 heat sealer at 250° F., 60 psi and 0.75 second dwell. An Instron (model-1122) was used to measure the force required to separate the metal layer from the metal receiving layer, with the failure mode being metal removed from the film. The average force required to pull off the metal layer was recorded.

Crazing resistance data were observed by extrusion laminating the metallized film. Polyethylene was melted at 625° F., and then applied at a weight of 10 lb/ream as lamination. Tension on the film at lamination was increased to 1.2 N/cm of film width.

Table 3 lists WVTR, OTR, crazing and metal adhesion data measured for examples E1 to E3 and comparative examples C1 to C5.

TABLE 3

| Example | OD | Metal adhesion flame only g/25 mm (Bell jar) (EAA method) | Metal adhesion flame + plasma g/25 mm (Laminating method) | WVTR (No plasma) g/m²/day ASTM F1249 | OTR (No plasma) cc/m²/day ASTM D3895 | Crazing |
|---|---|---|---|---|---|---|
| E1 | 3.1 | 380 | 256 | 0.01 | 3.1 | Light-Medium |
| E2 | 3.3 | 437 | 359 | 0.01 | 2.7 | Very light |
| C1 | 3.1 | 362 | 173 | 0.19 | 20.6 | Medium |
| C2 | 2.8 | 240 | 60 | 0.19 | 4.7 | Medium-high |
| C3 | 3.0 | 275 | 34 | 0.04 | 3.0 | Medium-high |
| C4 | 3.2 | 308 | 182 | 0.06 | 7.2 | Medium-high |
| C5 | 2.8 | 318 | 152 | 0.02 | 4.4 | Medium-high |

The addition of 10-20 wt. % of m-EP copolymer having an ethylene content of less than 10 wt. % greatly improves metal adhesion, crazing property, together with low WVTR and OTR. The metal adhesion data of E1 is at least 20% (EAA method) or at least 68% (Laminating method) better than the metal adhesion data of C5. The WVTR of E1 is about 50% lower than the WVTR of C5. The OTR of E1 is comparable with the OTR of C3, about 34% better than the OTR of C2, about 57% better than the OTR of C4, and about 30% better than the OTR of C5.

Example E3 and comparative examples C6-C7 were produced on a six-meter wide orienter using conditions same as examples E1-E2 and comparative examples C2-C5. Table 4 shows that Example E3 has high metal adhesion, good appearance, good metal adhesion, low WVTR, low OTR and no crazing.

TABLE 4

| | Appearance | OD | Metal Adhesion g/25 mm EAA method | WVTR (No plasma) g/m²/day ASTM F1249 | OTR (No plasma) cc/m²/day ASTM D3895 | Crazing |
|---|---|---|---|---|---|---|
| E3 | Good | 2.8 | 247 | 0.05-0.08 | 5.4-8.9 | None |
| C6 | Poor | 2.2 | 151 | 0.37 | 40.3 | None |
| C7 | Poor | 2.2 | 203 | 1.30 | 191.0 | None |
| C1 | Very good | ~2.4 | OK | ~0.2 | ~26.0 | Medium-heavy |

Examples E4-E6 and comparative examples C8-C12 were metallized on the Galileo metallizer without in-chamber plasma treatment.

TABLE 5

| | OTR (No plasma) cc/m²/day ASTM D3895 | Metal adhesion flame only g/25 mm (Bell jar) (EAA method) | Metal adhesion flame + plasma g/25 mm (Laminating method) | Crazing |
|---|---|---|---|---|
| E4 | 6.3 | 424 | 400 | None |
| E5 | 11.1 | 197 | 211 | Light |
| E6 | 2.9 | 391 | 304 | Light |
| C8 | 5.3 | 360 | 579 | Medium-Heavy |
| C9 | 44.5 | 412 | 343 | None |
| C10 | 75.4 | 108 | 130 | Very light |
| C11 | 19.6 | 119 | 226 | Light |
| C12 | 81.9 | 179 | 336 | Heavy |

Results of examples E4-E6 (Table 5) demonstrate that films made with a metal receiving layer having 5 to 25 wt. % of metallocene-catalyzed ethylene-propylene copolymer having an ethylene content of 9 wt. % have high metal adhesion, low OTR and low crazing.

Those skilled in the art will recognize that a wide variety of modifications, alterations, and combinations can be made with respect to the above described embodiments without departing from the spirit and scope of the invention.

What is claimed is:

1. A film comprising a first layer, said first layer comprising a blend of a first polymer comprising an olefin monomer having 2 to 10 carbons, and greater than 15 and equal to or less than 25 wt. % of a second polymer, said second polymer comprising a metallocene-catalyzed elastomeric ethylene-propylene copolymer having an ethylene content of less than or equal to 10 wt. %, wherein said first polymer is different from said second polymer, and wherein one or more layers of the film include cavitating agents or void-initiating particles.

2. The film of claim 1, wherein said first polymer is a homopolymer.

3. The film of claim 1, wherein said first polymer is a Zeigler-Natta catalyzed polypropylene.

4. The film of claim 1, wherein said second polymer has an ethylene content of less than or equal to 9 wt. %.

5. The film of claim 1, wherein said blend has 10-25 wt. % of said second polymer.

6. The film of claim 1, wherein said blend has 15-25 wt. % of said second polymer.

7. The film of claim 1, further comprising a second polymeric layer.

8. The film of claim 1, further comprising a metal layer, said metal layer is manufactured by vacuum deposit of at least one of aluminum, silver, copper, gold, silicon, germanium, iron, and nickel.

9. A film comprising a first layer, said first layer comprising a blend of a first polymer comprising an olefin monomer having 2 to 10 carbons, and greater than 15 and equal to or less than 25 wt. % of a second polymer, said second polymer comprising a metallocene-catalyzed elastomeric propylene-.alpha.-olefin copolymer having a melting temperature in the range of about 80° C. to about 135° C., wherein said first polymer is different from said second polymer, and wherein one or more layers of the film include cavitating agents or void-initiating particles.

10. The film of claim 9, wherein said first polymer is a homopolymer.

11. The film of claim 9, wherein said first polymer is a Zeigler-Natta catalyzed polypropylene.

12. The film of claim 9, wherein said second polymer is an elastomeric ethylene-propylene copolymer having an ethylene content of less than or equal to 9 wt. %.

13. The film of claim 9, wherein said blend has 10-25 wt. % of said second polymer.

14. The film of claim 9, wherein said blend has 15-25 wt. % of said second polymer.

15. The film of claim 9, further comprising a second polymeric layer.

16. The film of claim 9, further comprising a metal layer, said metal layer is manufactured by vacuum deposit of at least one of aluminum, silver, copper, gold, silicon, germanium, iron, and nickel.

17. A method of making film of claim 1 comprising:
   a. extruding a blend of said first polymer and said second polymer to form said first layer, optionally co-extruding said blend with at least one polymeric material to form a multilayer film.

18. The method of claim 17 further comprising:
   b. orienting said film in at least one of MD, TD, or both.

19. The method of claim 17 further comprising:
   c. metallizing said first layer.

20. A package comprising a film of claim 1.

21. The film of claim 9, wherein said second polymer is a metallocene-catalyzed elastomeric ethylene-propylene copolymer having an ethylene contents of less than or equal to 11 wt %.

* * * * *